United States Patent [19]
Simms, Jr.

[11] 3,936,925
[45] Feb. 10, 1976

[54] METHOD FOR ATTACHING EXTRUSIONS AND THE LIKE TO FRAME MEMBERS

[75] Inventor: Dewey M. Simms, Jr., Westland, Mich.

[73] Assignee: Burroughs Corporation, Detroit, Mich.

[22] Filed: Dec. 19, 1974

[21] Appl. No.: 534,453

Related U.S. Application Data

[62] Division of Ser. No. 356,394, May 2, 1973, abandoned.

[52] U.S. Cl. .................. 29/446; 29/427; 29/526; 52/758 F; 85/8.8; 151/69
[51] Int. Cl.² ........................................ B23P 11/02
[58] Field of Search ............ 29/526, 446, 427, 229, 29/417, 45, 235; 85/5 R, 5 N, 5 M, 5 CP, 8.8; 174/52 R; 151/69; 52/758 F

[56] References Cited
UNITED STATES PATENTS

| | | | |
|---|---|---|---|
| 358,389 | 2/1887 | Dunn | 85/5 P UX |
| 2,322,949 | 6/1943 | Lux | 85/8.8 UX |
| 2,771,591 | 11/1956 | Vordtriede | 151/69 UX |
| 3,344,502 | 10/1967 | Maier | 29/417 |
| 3,780,353 | 12/1973 | Gordon | 174/52 R X |
| 3,812,756 | 5/1974 | Wenger | 85/8.8 |
| 3,827,131 | 8/1974 | Coltrin | 29/526 X |

*Primary Examiner*—Charlie T. Moon
*Attorney, Agent, or Firm*—Edwin W. Uren; Paul W. Fish

[57] ABSTRACT

A cotter pin having a conical circumferential recess is provided for securely attaching extrusions and the like to frame members in business machines and other apparatus, such recess serving to translatably carry a C-shaped spring member as between discrete positions of varying diameters within the recess, insertion of the pin through an aperture formed in the frame member, with a concave resilient washer disposed adjacent the head thereof, into a cylindrical channel formed in the extrusion serving to translate the C-shaped spring to a discrete position corresponding to the smallest diameter of the recess, to thereby permit ready ingress of the pin to a position in the channel wherein the head of the pin has effectuated a yielding action of the resilient washer, release of the pin upon completion of its insertion serving to translate the C-shaped spring to a discrete position within the recess where it is grippably impinged between a larger diametered portion of the recess and the walls of the cylindrical channel, such translation to said grippable position being effectuated by a slight outward movement of the pin in the channel as motivated by the restoring action of the resilient washer.

4 Claims, 7 Drawing Figures

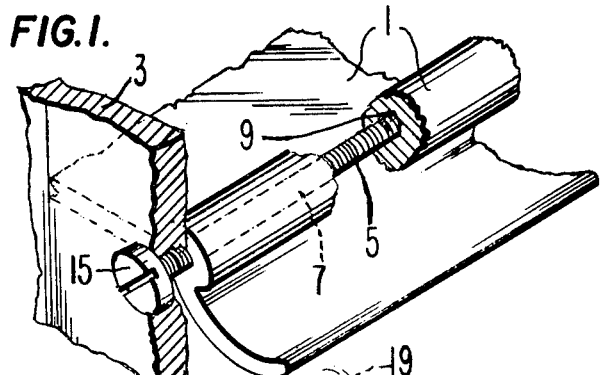
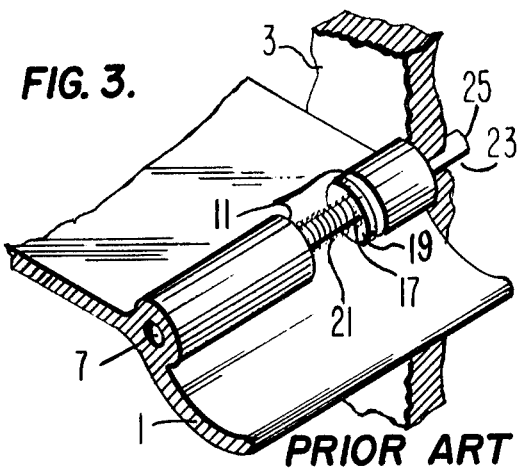
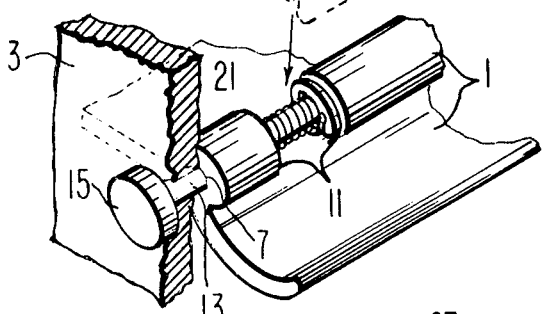
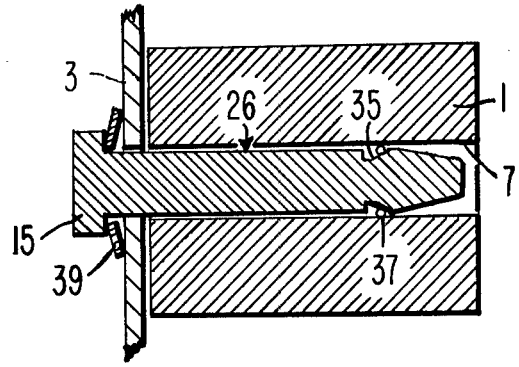
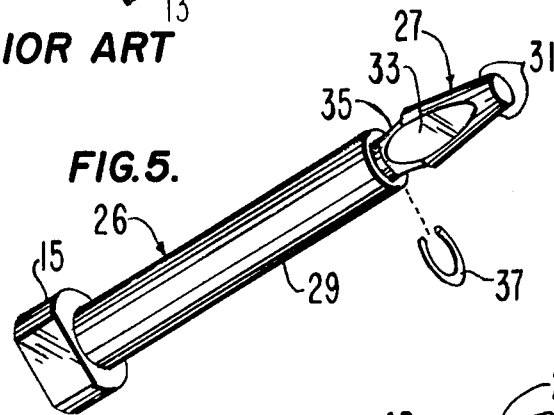
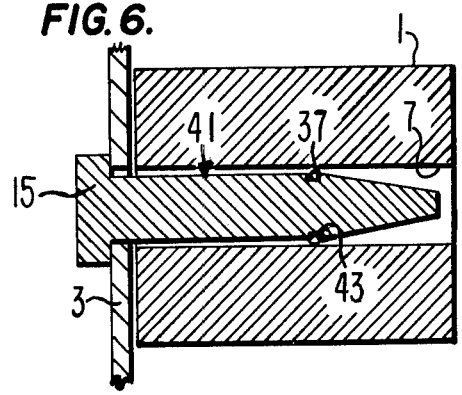

METHOD FOR ATTACHING EXTRUSIONS AND THE LIKE TO FRAME MEMBERS

This is a division of application Ser. No. 356,394, filed May 2, 1973, now abandoned.

BACKGROUND OF THE INVENTION

1. Field of the Invention

The present invention relates generally to methods and means for attaching extrusions and the like to frame members, as for example for attaching various kinds and types of horizontal supporting members to side frames of a nature commonly used in business machines and the like.

2. Description of the Prior Art

As is well known in the mechanical arts, many different methods and means have been utilized for attaching extrusions and other types of formed members to frame structures, such methods and means involving a wide variety of schemes of varying degrees of complexity. A common motive underlying the provocating inventive effort that has given rise to such variety of arrangements has been the desire to achieve a completely reliable connection between such members at minimal material and labor costs.

Typical of the prior art methods and means for attaching extrusions and the like to frame members are those illustrated in FIGS. 1 through 3. In FIG. 1 an extrusion 1 is shown attached to a frame member 3 by means of a screw 5 inserted through an aperture formed in the frame member and into a cylindrical channel 7 formed in the extrusion 1, the channel 7 being provided with threads 9 for retainably receiving the threads of the screw 5. In FIG. 2 an extrusion 1 having a vertical slot 11 formed therein is shown attached to a frame member 3 by means of a pin 13 slidably disposed in the cylindrical channel 7 of the extrusion 1, the pin 13 having a head portion 15 and a circular groove 17, the groove 17 being accessible by means of the vertical slot 11 for installing an E-ring retainer 19 thereinto, a helical spring 21 also being disposed on the pin 13 interposed between the leftmost extremity of the slot 11 and the E-ring retainer 19, the function of the helical spring 21 being to resiliently urge the pin 13 to a fully engaged position with respect to the channel 7 such that the head 15 thereof is held in contact with the frame member 3. In FIG. 3 an extrusion 1 having a vertical slot 11 is shown in attached relationship relative to a frame member 3 by means of a headless pin 23 that is slidable in the cylindrical channel 7 of the extrusion 1, the pin 23 also having a circular groove 17 formed therein which is accessible by means of the vertical slot 11 for installing an E-ring retainer 19 thereinto, a helical spring 21 being disposed on the pin 23 interposed between the E-ring retainer 19 and the leftmost extremity (as viewed in FIG. 3) of the vertical slot 11. The helical spring 21 thus biases the pin 23 in an outward direction relative to the extrusion 1 to thereby hold a tip end 25 of the pin into engaged relationship relative to an aperture formed in the frame member 3.

The disadvantages of these prior art attachment methods share the common characteristic of relatively high materials and labor costs. For example the arrangement illustrated in FIG. 1 requires the use of a screw and the performance of an additional machining operation on the extrusion 1, that of forming the threads 9 in the walls of the cylindrical channel 7. The arrangement of FIG. 2, while eliminating the need of a screw, requires still a different additional machining operation on the extrusion 1, that of forming the vertical slot 11, and the performance of a difficult assembly operation involving the installation of the helical spring 21 and the E-ring retainer 19 on the pin 13 within the confined area of the slot 11. The arrangement of FIG. 3 also requires the additional slot-cutting machining operation on the extrusion 1, and the performance of the difficult and time consuming assembly operation referred to above in connection with the FIG. 2 arrangement.

SUMMARY OF THE INVENTION

It is accordingly an object of the present invention to provide an improved method for attaching extrusions and the like to frame members wherein costly machining operations to the extrusions are minimized, as by eliminating the need for slotting the extrusions and for threading the cylindrical channels formed therein.

Another object of the invention is to provide improved means for attaching extrusions and the like to frame members wherein economies may be realized by eliminating the need of screws and E-ring retainers.

It is still a further object of the present invention to provide an improved method for attaching extrusions and the like to frame members wherein economies may also be realized in labor expense, as by eliminating difficult and time consuming assembly tasks.

Still another object of the present invention is to provide a means of attaching extrusions and the like to frame members that is completely reliable and provides optimized resistance to the displacement of the extrusions from the frame members.

Yet another object of the present invention is to provide a means of attaching extrusions to frame members wherein the connection therebetween is not susceptible of failure due to environmental vibrations and forces applied to the extrusions or to the frame members.

An important aspect of the inventive method for attaching extrusions and the like to frame members is the provision of a cotter pin having a conical circumferential recess disposed along a shank portion thereof, and a C-shaped spring translatably carried in the conical recess to assume discrete positions therein corresponding to varying diameters of the recess, insertion of the cotter pin into a cylindrical channel formed in the extrusion serving to translate the C-shaped spring to a discrete position corresponding to the smallest diametered portion of the recess, and the application of an expelling force to the pin serving to translate the C-shaped spring to a discrete position wherein a grippably impinging relationship with the walls of the cylindrical channel is established, withdrawal of the pin from the channel and displacement of the extrusion from the frame member being accordingly rigorously resisted.

Another aspect of the invention is the use of a resilient concave washer in association with the conically recessed cotter pin, the washer being installed on the pin to a position adjacent the head thereof before the pin is passed through an aperture formed in the frame member and inserted into the cylindrical channel of the extrusion, the effect of such resilient washer, after the pin has been fully inserted into the extrusion to a point where the washer has yielded to the insertional force applied by the head of the pin, is to urge the pin slightly outwardly of the channel to thereby translate the C-shaped spring to a position of grippable impingement against the walls of the cylindrical channel.

A further aspect of the invention is the provision of an improved method for attaching extrusions of a relatively lightweight nature to frame members in a vibration-free environment, such method involving the use of another embodiment of the inventive cotter pin which provides a circular groove rather than a conical recess for carrying the C-shaped spring, the inner diameter of the circular groove supporting the spring when in a compressed state to thereby establish a moderate gripping relationship with the walls of the cylindrical channel, insertion and withdrawal of the pin relative to the channel being characterized by a resistive dragging action sufficient for opposing the displacement of the extrusions from the frame members.

BRIEF DESCRIPTION OF THE DRAWING

These and other objects and advantages of the invention will be apparent from the following description when read in conjunction with the accompanying drawing figures, wherein:

FIG. 1 is a partial sectional view of a prior art method for attaching extrusions to frame members involving the use of screws and the formation of threads in the extrusion channels;

FIG. 2 is a partial sectional view of another prior art method for attaching extrusions to frame members involving the slotting of the extrusions and the use of biased slidable pins in the extrusion channels;

FIG. 3 is a partial sectional view of still another prior art method for attaching extrusions to frame members involving the slotting of the extrusions and the use of biased and slidable headless pins in the extrusions channels;

FIG. 4 is a partial sectional view of the improved method for attaching extrusions to frame members, as disclosed and claimed in the present application;

FIG. 5 is an illustration of the preferred embodiment of the inventive cotter pin utilized in the improved method of attachment shown in FIG. 4;

FIG. 6 is a partial sectional view of an improved method of attachment that is suitable for lightweight extrusions in a vibration-free environment; and FIG. 7 is a detailed view of the inventive cotter pin utilized in the attachment method shown in FIG. 6.

DESCRIPTION OF THE PREFERRED EMBODIMENTS

Improved methods for attaching extrusions and the like to frame members in business machines and other apparatus are hereinafter described with reference to FIGS. 4 through 7, a preferred method being described with reference to FIGS. 4 and 5, and a further method, which is particularly suitable for attaching lightweight extrusions to frame members in a vibration-free environment, is described with reference to FIGS. 6 and 7.

The cotter pin utilzed in the preferred attachment method, generally indicated at 26 in FIG. 4, is comprised of a head portion 15, a nose portion generally indicated at 27 in FIG. 5, and a shank portion 29, the nose portion 27 being comprised of conical slopes 31 leading in an increasing order of diameter from the insertional edge thereof, and a pair of oppositely disposed flatted surfaces 33 that interrupt the continuity of the conical slopes 31. The cotter pin 26 is additionally provided with a conical recess 35 disposed intermediate the nose portion 27 and the shank portion 29, the slopes of such conical recess being inversely disposed relative to the conical slopes 31 of the nose portion 27. Carried in the conical recess 35 is a C-shaped spring 37 which is translatable to discrete positions within the recess that corresponds to varying diameters thereof, a position immediately adjacent the shank portion 29 corresponding to the smallest diametered portion of the recess and a position immediately adjacent the nose portion 27 corresponding to the largest diametered portion of the recess.

It can be seen with reference to FIG. 4 that installation of a concave resilient washer 39, of the Bellville type, on the shank portion 29 adjacent the head portion 15 of the pin 26, and insertion of the pin 26 through an aperture formed in the frame member 3 and into a cylindrical channel 7 formed in the extrusion 1 will result in the translation of the C-shaped spring 37 to a discrete position corresponding to the smallest diametered portion of the conical recess 35, to thereby permit ready ingress of the pin 26 into the channel 7. A continued inward insertional thrust of the pin 26 into the channel 7, as by applying force to the head portion 15, will be effective to compress the concave resilient washer 39 between the frame member 3 and the head portion 15 and to effectuate a slight additional insertional movement of the pin 26 into the channel 7. Release of the force applied to the head portion 15 will permit a slight outward movement of the pin 26 within the channel 7, as motivated by the restoring action of the resilient washer 39, such slight outward movement of the pin 26 being effective to translate the C-shaped spring 37 to a position corresponding to a larger diametered portion of the recess 35 and into a grippable impinging relationship with the walls of the channel 7. This grippable impinging relationship of the C-shaped spring 37 with the walls of the channel 7 will serve to rigorously resist withdrawal of the pin 26 from the extrusion and displacement of the extrusion from the frame member. As a matter of fact, this grippable action of the C-shaped spring 37 against the walls of the channel 7 will generally be such that the pin 26 cannot be removed from the extrusion, except by means of a bifurcated tool (not shown), the two prongs of the tool being insertable into the inner end of the channel 7 to thereby bypass the flattened surfaces 33 of the nose portion 27 of the pin 26 and to contactably engage the C-shaped spring 37, a slight dislodging force applied by the tool being effective to displace the C-shaped spring from its grippable impinging relationship relative to the walls of the channel 7 and the larger diametered portion of the recess, withdrawal of the pin 26 from the extrusion 1 and displacement of the extrusion from the frame member 3 being thereby enabled.

Another embodiment of a cotter pin effective for attaching lightweight extrusions 1 to frame members 3 in a vibration-free environment is illustrated in FIG. 7 and generally indicated at 41 in FIG. 6. Cotter pin 41 is provided with a head portion 15, a nose portion 27 having conical slopes 31 similar to the slopes of the pin 26, and a shank portion 29 connecting the head portion 15 and the nose portion 27. Interposed between the shank portion 29 and the nose portion 27 of the pin 41 is a circular groove 43 for carrying the C-shaped spring 37, such spring being compressible within the groove 43 to present an outer diameter slightly larger than the diameter of the shank portion 29 and substantially equal to the inner diameter of the channel 7 formed in the extrusion 1. It can be seen from FIG. 6 that insertion of the pin 41 through an aperture formed in the frame member 3 and into the cylindrical channel 7 formed in the extrusion 1, to a position wherein the head portion 15 abuttably contacts the outer surface of the frame member 3, will be accompanied by a resistive drag of the compressed spring 37 against the walls of the channel 7, such resistive drag serving to oppose withdrawal of the pin 41 from the extrusion 1, such opposition being effective to prevent displacement of lightweight extrusions in such environments.

Although the inventive cotter pins 26 and 41, and their utilization in effecting improved means for attaching extrusions to frame members, have been described herein in considerable detail, it will be appreciated that various modifications in either the structure or utilization of the pins may be made by persons skilled in the art without departing from the true spirit and scope of the invention.

I claim:

1. A method of attaching an extrusion or the like to a frame member or the like, said method being effective for providing a secure connection therebetween irrespective of the weight of the extrusion or the displacement forces applicable to the extrusion or to the frame member that would tend to effectuate their inadvertent disconnection, said method comprising the steps of:
   a. forming a cylindrical channel in said extrusion in an edge thereof that is to be connected to said frame member,
   b. forming an aperture of equal or slightly greater diameter than the diameter of said cylindrical channel in said frame member in an area thereof to which said extrusion is to be attached,
   c. selecting or forming a self-locking pin of predetermined configuration and of a diameter slightly less than the diameter of said cylindrical channel, said predetermined configuration of said pin providing a shank portion defining the diameter of said pin, a head portion, a nose portion opposite said head portion and including inclined conical slopes leading in an increasing order of diameter from a leading edge thereof, a conical recess contiguous to and sloping inversely relative to said conically sloping nose portion, and a compressible and expandable C-shaped spring translatably carried in said conical recess and having an outer diameter slightly greater than the diameter of said shank portion when said spring is disposed in a relaxed state in a discrete position corresponding to the smallest diameter of said recess,
   d. installing a resilient concave washer on the shank portion of said pin adjacent the head portion thereof,
   e. inserting said self-locking pin through said aperture formed in said frame member and into said cylindrical channel formed in said extrusion, said insertion being accompanied, nearing the completion thereof, by the application of sufficient force to overcome the resiliency of said washer between said head portion of said pin and said frame member, and
   f. releasing said pin to the expelling force applied by said resilient concave washer thereto, said expelling force being effective to translate said pin slightly outwardly of said channel and to thereby expandably translate said C-shaped spring carried in said conical recess to a discrete position therein corresponding to an increased diameter thereof wherein said spring is grippably impinged against the walls of said cylindrical channel formed in said extrusion to rigorously resist withdrawal of said pin therefrom and separation of said extrusion from said frame member.

2. A method involving the use of a self-locking pin of predetermined diameter and configuration for securably connecting a pair of like or unlike members, said method comprising the steps of:
   a. forming a cylindrical channel of slightly greater diameter than the diameter of said pin in a first of said members,
   b. forming an aperture of equal or slightly greater diameter than the diameter of said cylindrical channel of said first member in a second of said members,
   c. physically aligning said pair of members such that said aperture formed in said second member is registered with said cylindrical channel formed in said first member,
   d. installing a resilient concave washer on a shank portion of said self-locking pin in abutting relationship with a head portion thereof, said self-locking pin being further characterized by a conically sloping nose portion oppositely disposed of said head portion, a conical recess contiguous to and sloping inversely relative to said conically sloping nose portion, and a compressible and expandable C-shaped spring translatably carried in said conical recess and having an outer diameter slightly greater than the diameter of said shank portion when said spring is disposed in a relaxed state in a discrete position corresponding to the smallest diameter of said conical recess,
   e. inserting said self-locking pin through said aperture formed in said second member and into said cylindrical channel formed in said first member, said insertion being accompanied, nearing the completion thereof, by the application of sufficient force to overcome the resiliency of said washer between said head portion of said pin and said second member, and
   f. releasing said pin to the expelling force applied by said resilient concave washer thereto, said expelling force being effective to translate said pin slightly outwardly of said channel and to thereby translate said C-shaped spring carried in said conical recess to a discrete position therein corresponding to an increased diameter thereof wherein said spring is expandably and grippably impinged against the walls of said cylindrical channel formed in said first member to rigorously resist withdrawal of said pin therefrom and separation of said first and said second members.

3. A method of connecting a pair of like or unlike members in secure abutting relationship without end-play therebetween and such that the members may not be separated upon the application of variable displacement forces, said method comprising the steps of:
   a. forming a cylindrical channel of predetermined diameter in a first of said members,
   b. forming an aperture of equal or slightly greater diameter than the diameter of said cylindrical channel in a second of said members,
   c. forming a locking pin comprised of a head portion, a nose portion including inclined conical slopes leading in an increasing order of diameter from a leading edge thereof, an interconnecting cylindrical shank portion, and a conical recess disposed contiguous to and sloping inversely relative to said conically sloping nose portion, said shank portion having a diameter slightly less than the diameter of said cylindrical channel, d. installing a resilient concave washer on the shank portion of said locking pin adjacent the head portion thereof, e. disposing a compressible and expandable C-shaped spring in said conical recess of said locking pin, said spring having an outer diameter slightly greater than the diameter of said shank portion when said spring is disposed in a relaxed state in a discrete position of said recess corresponding to the smallest diameter thereof, f. inserting said locking pin through said aperture formed in said second member and into said cylindrical channel formed in said first member, said insertion being accompanied, nearing the completion thereof, by the application of sufficient force to overcome the resiliency of said washer between said head portion and said second member, and g. releasing said locking pin to the expelling force applied by said resilient washer thereto, said expelling force being effective to translate said pin slightly outwardly of said channel and to thereby expandably translate said C-shaped spring to a discrete position within said conical recess corresponding to an increased diameter thereof wherein said spring is grippably impinged against the walls of said cylindrical channel of said first member to rigorously resist withdrawal of said pin therefrom and separation of said first and said second members.

4. The method of connecting a pair of like or unlike members as defined in claim 3 wherein the step of forming said locking pin includes the step of providing said nose portion and said conical recess with a pair of oppositely disposed flattened surfaces for permitting removal tool access through one end of said cylindrical channel to said spring when said first and said second members are securably connected together, the insertion of said removal tool communicating with said flatted surfaces to dislodge said spring from its impinging relationship with the walls of said cylindrical channel to thereby enable withdrawal of said locking pin from said cylindrical channel and separation of said first and second members.

* * * * *